3,308,157
N-(BENZOCYCLOBUTENE-1-LOWERALKYL)-
CARBOXYLIC ACID AMIDES
Jerry E. Robertson, St. Paul, Minn., and Joseph A. Skorcz, Milwaukee, Wis., assignors to Colgate-Palmolive Company, a corporation of Delaware
No Drawing. Filed Aug. 7, 1964, Ser. No. 388,299
3 Claims. (Cl. 260—562)

This invention relates to benzocyclobutenes. More particularly, this invention is concerned with novel amine derivatives of benzocyclobutenes, processes of producing such compounds and medicinal uses for the compounds.

According to the present invention there are provided novel amines of benzocyclobutenes of the formula

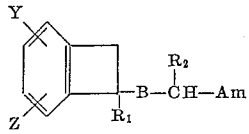

and acid addition salts thereof, in which Y and Z represent hydrogen, hydroxyl, lower alkoxy such as methoxy, ethoxy and propoxy, lower thioalkyl such as thiomethyl and thioethyl, methylenedioxy and trifluoromethyl, $R_1$ represents hydrogen, a lower alkyl such as methyl, ethyl and propyl, an aralkyl such as a phenyl-lower alkyl including benzyl and phenethyl, a cycloalkyl having 3 to 7 carbons in the ring including cyclopropyl, cyclopentyl and cyclohexyl, cycloalkyl-lower alkyl groups such as cyclopentylmethyl, cyclohexylethyl and other such groups in which the cycloalkyl has 3 to 7 carbons in the ring, $R_2$ is hydrogen or a lower alkyl such as methyl, ethyl and propyl, B is a single chemical bond or a straight or branched lower alkylene having up to 4 carbons in a chain such as methylene, ethylene, isopropylene and butylene, and Am represents pyrrolidino, piperidino, morpholino, a 4-lower alkyl-piperazino such as 4-methylpiperazino, a 4-(phenyl-lower alkyl)-piperazino such as 4-benzylpiperazino, acylamino groups including acetylamino, propionylamino, butyrylamino, benzoylamino, phenylacetylamino and 5-pyrrolidone-2-carboxyamino, and amino groups of the formula $$-N\begin{matrix}R_3\\R_4\end{matrix}$$

wherein $R_3$ and $R_4$ are selected from the list of groups for $R_1$, as well as aryl groups such as phenyl.

This invention uses as starting materials compounds of the formula

in which B, $R_1$, Y and Z have the significance previously assigned. Some such starting materials which can be named include
1-cyanobenzocyclobutene,
1-cyanomethylbenzocyclobutene,
1-(2-cyanoethyl)-benzocyclobutene,
1-(1-cyanoethyl)-benzocyclobutene,
1-(3-cyanopropyl)-benzocyclobutene,
1-cyano-3-methyl-benzocyclobutene,
1-cyano-6-trifluoromethyl-benzocyclobutene,
1-cyanomethyl-4,5-methylenedioxy-benzocyclobutene,
1-cyanomethyl-3,4-dimethoxy-benzocyclobutene,
1-cyano-1-methyl-benzocyclobutene,
1-cyanomethyl-1-ethyl-3-methoxy-benzocyclobutene,
1-(3-cyanopropyl)-1-benzyl-6-trifluoromethyl-benzocyclobutene and
1-cyanomethyl-1-cyclopentylmethyl-benzocyclobutene.

Probably the simplest compounds of this invention are the primary amines. They can be produced by converting the nitrile group of the starting materials to a methyleneamine group by reductive procedures. This reaction can be represented as follows:

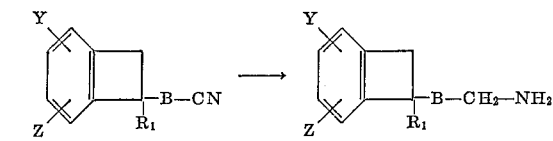

in which B, $R_1$, Y and Z have the assigned significance.

This reduction can be readily effected by chemical means, such as the use of lithium aluminum hydride under anhydrous liquid reaction conditions. Anhydrous ether is a suitable reaction medium. After reacting the mixture, the intermediate complex can be decomposed as with an aqueous alkali hydroxide solution. The ether layer can be decanted and dried with $K_2CO_3$ and the product collected by distillation or the product can be converted into an acid addition salt and recovered as such.

Some of the novel benzocyclobutene amines produced in this manner are
1-aminomethyl-benzocyclobutene,
1-(2-aminoethyl)-benzocyclobutene,
1-(2-aminopropyl)-benzocyclobutene,
1-aminomethyl-3-methyl-benzocyclobutene,
1-(2-aminoethyl)-6-methoxy-benzocyclobutene,
1-aminomethyl-4,5-methylenedioxy-benzocyclobutene,
1-(1-aminoethyl)-6-trifluoromethyl-benzocyclobutene,
2-aminomethyl-1-methyl-benzocyclobutene,
1-(2-aminoethyl)-1-benzyl-3-methoxy-benzocyclobutene and
1-(3-aminopropyl)-1-cyclohexylmethyl-benzocyclobutene.

The primary amines can also be produced by catalytic hydrogenation of one of the starting nitriles, advisably in the presence of acetic anhydride which forms an intermediate acetylate that is hydrolyzed to the free amine. This process can be represented as follows:

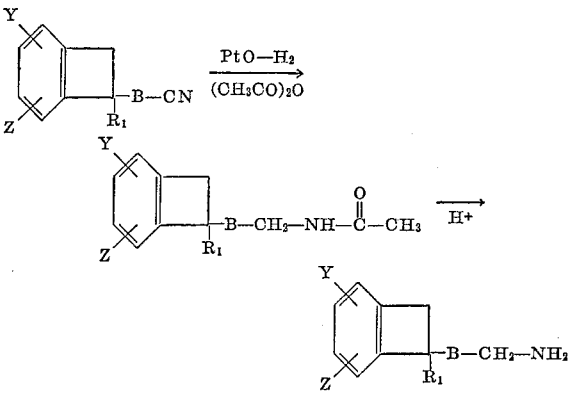

wherein B, $R_1$, Y and Z have the significance previously assigned. The process is especially suitable when acetic anhydride is used since it can function as the solvent and leads to high yields of the desired amine by forming the intermediate acetylate which suppresses side reactions. The catalytic hydrogenation can be effected at ambient or increased temperatures using platinum oxide as the catalyst and hydrogen at moderate pressures of about 1 to 5 atmospheres. The intermediate acetyl amine can be separated by conventional means and then hydrolyzed as with hydrochloric acid to give the primary amine.

Acyl derivatives of the benzocyclobutenyl primary amines provided herewith can be produced by reacting the amine with an appropriate acyl halide. This reaction can be represented as follows:

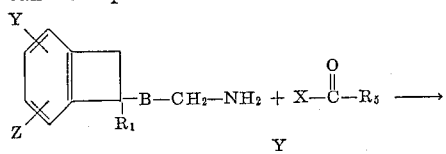

wherein B, $R_1$, Y and Z have the significance previously assigned, X is a reactive halo group such as the chloro or bromo groups and $R_5$ is hydrogen, a lower alkyl such as methyl, ethyl and propyl, phenyl, a phenyl-lower alkyl such as benzyl and phenethyl, a cycloalkyl having 3 to 7 carbons in the ring such as cyclopentyl and cyclohexyl, cycloalkyl-lower alkyl groups such as cyclopentylmethyl, cyclohexylethyl and similar groups in which the cycloalkyl has 3 to 7 carbons in the ring, and 2-(5-pyrrolidone). The reaction can be effected in an inert liquid reaction medium such as benzene, xylene, n-heptane and toluene. Approximately equimolar amounts of reactants can be employed. The reaction proceeds at room temperature although elevated temperatures such as the reflux temperature can be used to increase the reaction rate. An equivalent amount of an organic base such as triethylamine can be included in the reaction mixture to bind the hydrohalic acid released by the reaction. After the reaction is completed, which generally takes no more than 1 to 3 hours, the reaction mixture can be treated according to conventional manipulative techniques to isolate the desired product.

Some of the acyl halides of carboxylic acids which can be used in this reaction are formyl chloride, acetyl chloride, propionyl chloride, butyryl chloride, isopropionyl bromide, caproyl chloride, benzoyl chloride, phenylacetyl chloride, beta-phenylpropionyl chloride, gamma-phenylbutyryl chloride, cyclopentane carboxyl chloride, cyclohexane carboxyl chloride, cyclopentyl acetyl chloride and beta-cyclohexyl propionyl chloride.

Some of the benzocyclobutenyl amides formed in this way are

N-acetyl-1-aminomethyl-benzocyclobutene,
N-benzoyl-1-(2-aminoethyl)-benzocyclobutene,
N-cyclohexylacetyl-1-aminomethyl-3-trifluoromethyl-benzocyclobutene,
N-(1-benzocyclobutenylmethyl)-5-oxo-2-pyrrolidine-carboxamide,
N-acetyl-1-aminomethyl-1-methyl-benzocyclobutene,
N-benzoyl-1-(2-aminoethyl)-1-benzyl-benzocyclobutene and
N-cyclopentylacetyl-1-aminomethyl-1-cyclohexylmethyl-benzocyclobutene.

By routine hydrolysis the acyl groups of such amides can be cleaved to form the corresponding primary amines.

The amides can also be reduced to secondary amines with a reducing agent of which lithium aluminum hydride is preferred. This reaction can be represented as follows:

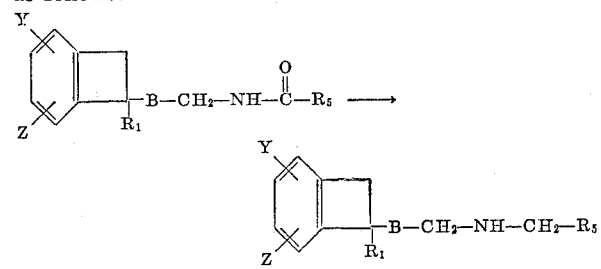

wherein B, $R_1$, Y, Z and $R_5$ have the significance previously assigned.

Secondary and tertiary amino benzocyclobutenes can also be produced by hydrolyzing a starting benzocyclobutenyl nitrile to the corresponding carboxylic acid, reducing the acid to the alcohol, converting the alcohol to a sulfonate and reacting the sulfonate with an amine to form the desired amine derivative of benzocyclobutene. This process can be represented as follows:

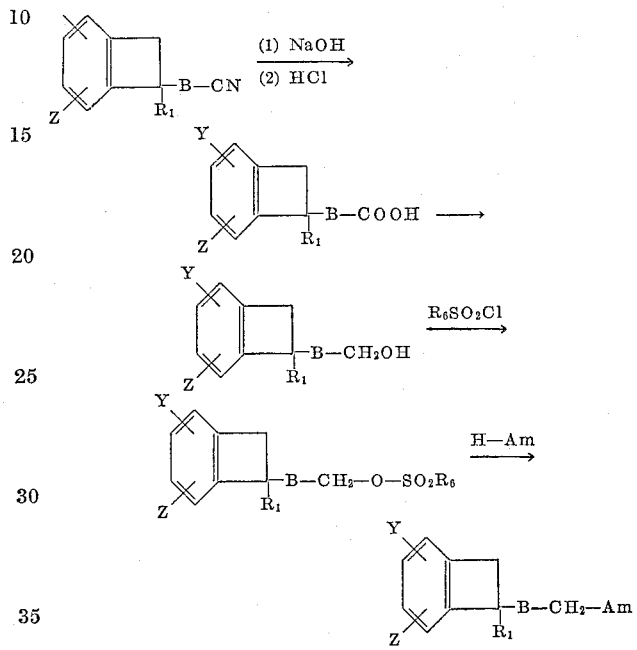

wherein B, $R_1$, Y, Z and Am have the significance previously assigned, but Am is not an acylamino group, and $R_6$ is a lower alkyl such as methyl and ethyl or an aryl group such as phenyl and p-methylphenyl.

The first step of the process in which the nitrile group is hydrolyzed to a carboxylic acid group can be readily effected by reacting the nitrile with an inorganic base, such as an alkali metal hydroxide, to convert the nitrile group to a carboxylic acid salt which can then be treated with acid to form the free carboxyl group.

Some of the benzocyclobutenyl carboxylic acids which can be produced as described are benzocyclobutene-1-carboxylic acid,
1-(carboxymethyl)-benzocyclobutene,
1-(2-carboxyethyl)-1-methyl-benzocyclobutene,
1-(2-carboxyisopropyl)-1-benzyl-benzoycyclobutene,
1-(carboxymethyl)-4-methoxy-benzocyclobutene and
1-(carboxymethyl)-7-trifluoromethyl-benzoycyclobutene.

Reduction of the carboxyl group to the methylenehydroxy group is readily effected with lithium aluminum hydride in an anhydrous liquid reaction medium such as ether or tetrahydrofuran. An intermediate complex alcoholate forms which upon hydrolysis with acid yields the free alcohol.

Some of the benzocyclobutenyl alcohols which can be produced as described are 1-hydroxymethyl-benzocyclobutene,
1-(2-hydroxyethyl)-benzocyclobutene,
1-hydroxymethyl-1-benzyl-benzocyclobutene,
1-hydroxymethyl-7-trifluoromethyl-benzocyclobutene and
1-hydroxyisopropyl-1-ethyl-3-methoxy-benzocyclobutene.

The benzocyclobutenyl alcohols can be readily converted to sulfonates by reacting the alcohol with a sulfonyl halide under basic conditions. Ethylsulfonyl chloride and p-toluenesulfonyl chloride illustrate the sulfonyl halides which can be used. Pyridine is preferred as the basic reaction medium. The reaction proceeds at ambient temperatures although lower temperatures are suitable.

By reacting a benzocyclobutenyl sulfonate, produced as described, with a primary or secondary amine the corresponding secondary and tertiary amines of benzocyclobutene can be produced. Among the amine reactants which can be used are lower alkyl amines such as methylamine, ethylamine, and propylamine, phenylamine, benzylamine, phenylethylamine, di-lower alkyl amines such as dimethylamine, diethylamine, dipropylamine, N-methyl-N-propyl amine, dicyclohexylamine, di-cyclopentylmethyl amine, pyrrolidine, piperidine, morpholine, 4-lower alkyl-piperazines such as 4-methylpiperazine and 4-ethylpiperazine, and 4-phenyl-lower alkyl-piperazines such as 4-benzylpiperazine and 4-(2-phenylethyl)-piperazine.

Representative of the secondary and tertiary amines of benzocyclobutene which can be produced using this process are N-methyl-1-aminomethyl-benzocyclobutene,
N-ethyl-1-aminomethyl-benzocyclobutene,
N-propyl-1-(2-aminoethyl)-benzocyclobutene,
1-(N,N-dimethylaminomethyl)-benzocyclobutene,
1-(2-N,N-diethylaminoethyl)-benzocyclobutene,
N-phenyl-1-aminomethyl-benzocyclobutene,
N-benzyl-1-aminomethyl-benzocyclobutene,
1-(N,N-dibenzylaminomethyl)-benzocyclobutene,
N-cyclohexyl-1-aminomethyl-benzocyclobutene,
N-methyl-1-aminomethyl-1-methyl-benzocyclobutene,
N-methyl-1-aminomethyl-3-methoxy-benzocyclobutene,
N-methyl-1-aminomethyl-7-trifluoromethyl-benzocyclobutene,
N-benzyl-1-aminomethyl-1-benzyl-3-methoxy-benzocyclobutene,
1-morpholinomethyl-benzocyclobutene,
1-piperidinomethyl-benzocyclobutene,
1-pyrrolidinomethyl-benzocyclobutene,
1-(4-methylpiperazino)-benzocyclobutene and
1-(2-pyrrolidinoethyl)-1-methyl-3-methoxy-benzocyclobutene.

The secondary amines, and the tertiary amines which are not cyclic, can also be produced by reacting a primary amine of cyclobenzobutene with an organic halide. An excess of the halide can be used to promote formation of the tertiary amines and an excess of the primary amine can be used to promote formation of the secondary amines. The formation of the secondary and tertiary amines can be illustrated as follows:

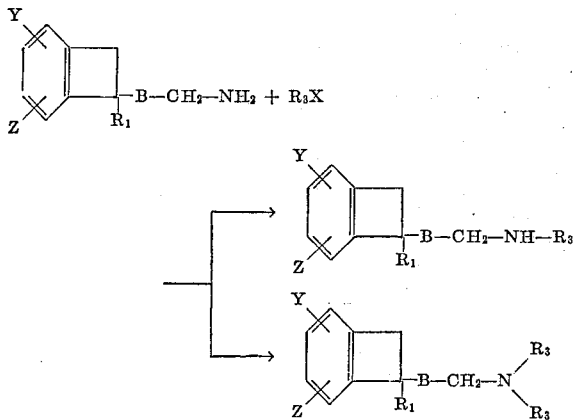

wherein B, Y, Z, $R_1$ and $R_3$ have the assigned significance and X is a reactive halo group such as chloro and bromo.

Benzocyclobutene amines of the formula

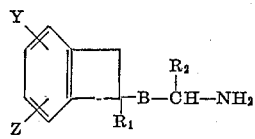

wherein Y, Z, B, $R_1$ and $R_2$ have the assigned significance but $R_2$ is not hydrogen also can be produced by reacting a cyano benzocyclobutene with a Grignard reagent to form an acyl benzocyclobutene, converting the acyl group to an oxime and reducing the oxime group to an amine group. This process may be represented as follows:

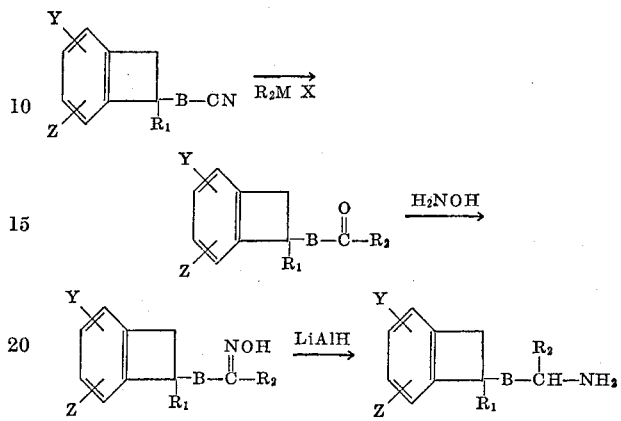

wherein X, Y, Z, B, $R_1$ and $R_2$ have the assigned significance but $R_2$ is not hydrogen.

The nitrile is reacted with a suitable Grignard reagent in the first step and the ketimine salt so formed is hydrolyzed to form the acyl benzocyclobutene.

Some of the Grignard reagents which can be used are methylmagnesiumbromide, phenylmagnesiumiodide, ethylmagnesiumchloride and benzylmagnesiumbromide.

The Grignard reaction is readily effected employing conventional conditions of solvent, temperature and the like. The complex ketimine salt is readily hydrolyzed by adding a weak acid to the resulting reaction mixture. The product can be isolated and purified by standard procedures.

Some of the acyl benzocyclobutenes formed in this way are 1-acetyl benzocyclobutene,
1-propionyl benzocyclobutene,
1-acetonyl benzocyclobutene,
1-phenylacetyl benzocyclobutene,
1-acetyl-1-methyl benzocyclobutene and
1-propionyl-7-trifluoromethyl benzocyclobutene.

The acyl benzocylobutenes, such as those just described, are next converted to oximes by reaction with hydroxylamine, advisably in an organic reaction medium in which the reactants are soluble. The hydroxylamine can be produced in situ by the neutralization of a hydroxylamine salt such as the hydrochloride. Inorganic bases such as the alkali metal hydroxides, carbonates and bicarbonates, as well as organic bases such as pyridine, can be used to neutralize the acid released from the hydroxylamine salt.

Lower alcohols such as ethanol and isopropanol, as well as other organic solvents in which the reactants are soluble, such as tetrahydrofuran, can be used as the reaction medium. The reaction is promoted by the use of moderately elevated temperatures with the reflux temperature being particularly suitable. The reaction is substantially completed in about 1 to 4 hours. After the reaction is terminated the reaction mixture can be chilled with ice water, extracted with ether and the oily product crystallized from a solvent such as cyclohexane.

Some of the 1-acyl-benzocyclobutene oximes which can be prepared as described are 1-acetyl benzocyclobutene oxime,
1-propionyl benzocyclobutene oxime,
1-acetonyl benzocyclobutene oxime,
1-phenylacetyl benzocyclobutene oxime,
1-acetyl-1-methyl benzocyclobutene oxime and
1-propionyl-7-trifluoromethyl benzocyclobutene oxime.

The oximes can be reduced to amines using lithium aluminum hydride at the conditions herein described for other reductions with this agent.

Some of the amines that are produced from the oximes are 1-(1-aminoethyl)-benzocyclobutene,
1-(2-aminopropyl)-benzocyclobutene,
1-(1-aminopropyl)-benzocyclobutene,
1-(1-amino-2-phenyl ethyl)-benzocyclobutene and
1-(1-aminoethyl)-1-methyl-benzocyclobutene.

Acid addition salts are produced by contacting the amines with a suitable acid such as formic acid, citric acid, maleic acid, sulfuric acid, hydrochloric acid, succinic acid, tartaric acid, benzoic acid or fumaric acid.

The amines and acyl derivatives provided herewith have sympathomimetic activity. They exert central nervous system stimulation, analgetic activity and skeletal muscle relaxant activity, in animals. The compounds also appear to be anorexogenics, analeptics, pressor agents, monoamine oxidase inhibitors, beta-oxidase inhibitors, and DOPA decarboxylase inhibitors. Since the amines are basic they can be used as neutralizing agents and to form salts with penicillin for separating and purifying this antibiotic.

The amines (including the acyl derivatives) of this invention may be administered to animals and humans as pure compounds. It is advisable, however, to first combine one or more of the compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be used to form powders. The powders may be used as such for direct administration to a patient or, instead, the powders may be added to suitable foods and liquids, including water, to facilitate administration.

The powders may also be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets and capsules may contain any suitable predetermined amount of one or more of the active agents as a nontoxic acid addition salt and may be administered one or more at a time at regular intervals. Such unit dosage forms, however, should generally contain a concentration of 0.1% to 10% by weight of one or more of the active agents. Unit dosage forms should advisably contain about 5 to 150 mg. of the active agents described herein.

A typical tablet may have the composition:

| | Mg. |
|---|---|
| (1) 1-aminomethyl-benzocyclobutene hydrochloride | 10 |
| (2) Starch U.S.P. | 57 |
| (3) Lactose U.S.P. | 73 |
| (4) Talc U.S.P. | 9 |
| (5) Stearic acid | 6 |

Powders, 1, 2 and 3 are slugged, then granulated, mixed with 4 and 5, and tableted.

Capsules may be prepared by filling No. 3 hard gelatin capsules with the following ingredients, thoroughly mixed:

| | Mg. |
|---|---|
| (1) N-methyl 1-aminomethyl-benzocyclobutene hydrochloride | 5 |
| (2) Lactose U.S.P. | 200 |
| (3) Starch U.S.P. | 16 |
| (4) Talc U.S.P. | 8 |

The oral route is preferred for administering the active agents of this invention. However, other modes of administration, such as parenteral, may be employed.

The starting nitriles of the formula

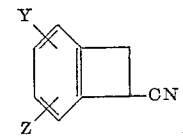

wherein Y and Z have the assigned significance, can be produced by reacting the appropriately nuclear substituted alpha-halo-O-halo toluene with ethyl cyanoacetate to form an ethyl 2-halobenzyl cyanoacetate, hydrolyzing said compound to form 2-halobenzyl-cyanoacetic acid, heating said compound in dimethylacetamide to form 3-(2-halophenyl)-propiononitrile and cyclizing said compound with sodamide in liquid ammonia to form 1-cyanobenzocyclobutene having on the phenyl group whatever nuclear substituents Y and Z that were there at the start of the process. This process can be represented as follows:

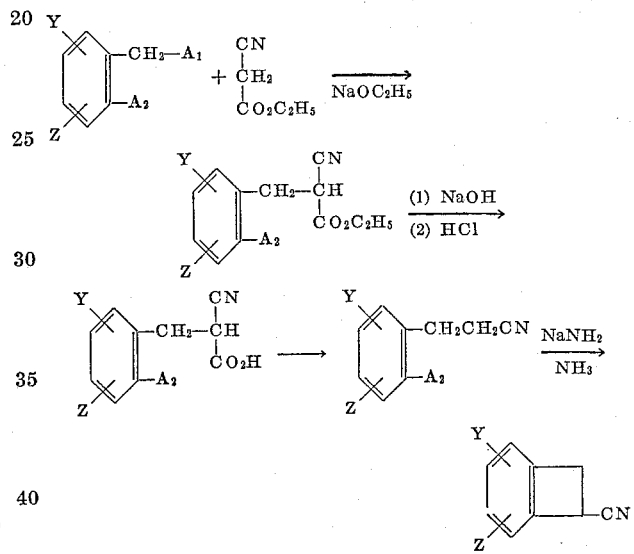

wherein Y and Z have the previously assigned meaning and $A_1$ and $A_2$ are the same or different reactive halo groups such as the chloro and bromo groups. Publications relevant to these reactions are J. Org. Chem., 27, 3836 (1962); J. Am. Chem. Soc., 80, 2257 (1958); and Canadian Journal of Research 28B, 352 (1950).

1-cyanoalkylene benzocyclobutenes can be built up a methylene at a time with straight chain alkylenes according to the following procedure

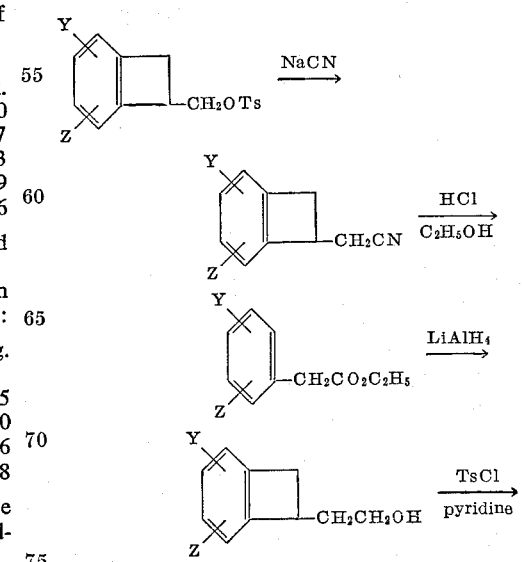

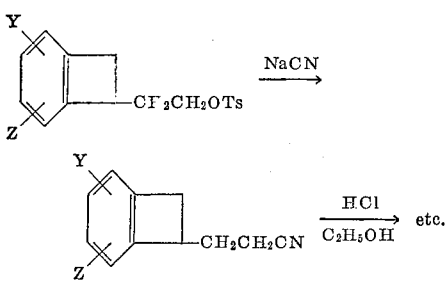

wherein Y and Z have the assigned significance and Ts is the tosyl group.

The 1-cyanoalkylene benzocyclobutenes in which the alkylene is branched can be prepared via the following process:

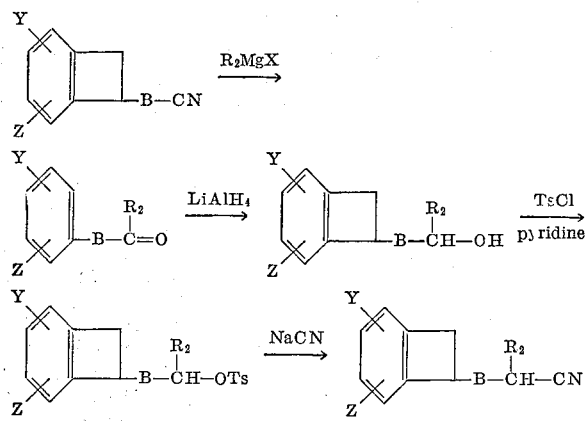

wherein Y, Z, B and Ts have the assigned meaning and $R_2$ is a lower alkyl. The alkyl represented by $R_2$ can be positioned at any point in the chain in this way with the location being determined by the starting nitrile. Once the branch is introduced the tosylate can be converted directly to an amine as previously shown or to the nitrile. The resulting branched nitrile can then, if desired, have one or more methylene groups added to the chain by oxidizing the nitrile to an acid, reducing the acid to an alcohol and then making a tosylate as more fully shown previously The starting nitriles used in this invention in which $R_1$ is a group other than hydrogen can be produced from the unsubstituted nitrile by reaction with an appropriate organic halide. The process can be illustrated as follows:

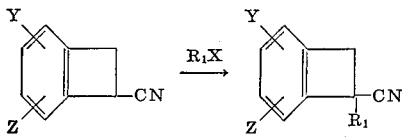

in which Y, Z and $R_1$ have the assigned significance but $R_1$ is not hydrogen and X is a reactive halo group such as chloro or bromo. Organic halides such as methyl chloride, ethyl bromide, phenyl chloride, benzyl chloride, 2-phenylethyl bromide, cyclopentyl chloride and cyclohexylmethyl chloride are representative reactants which can be used. The process can be effected in benzene in the presence of a halogen acceptor, such as sodamide, at moderately elevated temperatures. Products such as those previously described and named herein can be produced in this way.

The following examples are presented to further illustrate the invention:

*Example 1.—1-cyanobenzocyclobutene*

(A) *Ethyl 2-chlorobenzyl-cyanoacetate.*—To a solution of sodium (140 g.) in 4 liters of absolute ethanol was added 3043 g. of ethyl cyanoacetate at a moderate rate. The milky solution was stirred for 1 hour, then was treated with 966 g. of alpha, ortho-dichlorotoluene over a 2 hour period with the temperature kept below 30° C. After stirring for an hour, the solution was refluxed overnight. The solvent was removed by distillation and the organic residue was taken up in ether (1 liter). The ethereal solution was extracted with 1 liter of water which was separated and shaken with 500 ml. of ether. The combined ether portions were dried over anhydrous sodium sulfate and evaporated. The excess ethyl cyanoacetate was distilled, and the residue was fractionated to give the monobenzylated cyanoester, B.P. 117–123° C. at 0.025 mm.

*Analysis.*—Calcd. for $C_{12}H_{12}ClNO_2$: N, 14.93. Found: N, 14.92.

(B) *2-chlorobenzyl-cyanoacetic acid.*—Ethyl 2-chlorobenzyl-cyanoacetate (890 g.) was added to 2 liters of 10% aqueous sodium hydroxide kept at 25° C. by external cooling. The solution was stirred an additional 20 min. and, with continual cooling, was acidified with 525 ml. of concentrated hydrochloric acid. The colorless, crystalline precipitate was filtered, washed repeatedly with water and dried to afford the cyanoacid, M.P. 129–132° C.

*Analysis.*—Calcd. for $C_{10}H_8ClNO$: N, 6.68; Neut. equi., 209.6. Found: N, 6.65; Neut. equi., 212.2.

(C) *3-(2-chlorophenyl)-propiononitrile.*—A solution of 2-chlorobenzyl-cyanoacetic acid (750 g.) in 750 ml. of dimethylacetamide was kept within a temperature range of 135–155° C. for 2 hours. Nitrogen was bubbled through the solution during this time. On cooling, the solution was poured into 2 liters of water; the organic phase was taken up in ether, which was separated and dried over anhydrous sodium sulfate. The liquid that remained on removal of the solvent was distilled to afford the nitrile, B.P. 86–87° C. at 0.05 mm.

(D) *1-cyanobenzocyclobutene.*—3-(2 - chlorophenyl)-propiononitrile (67.5 g.) was allowed to react with 65 g. of sodium amide in 1.6 liters of liquid ammonia for 4 hours. The reaction mixture was neutralized with ammonium nitrate and the ammonia was allowed to evaporate. Water was added cautiously to the residue. The crude product was taken up in ether which was dried over anhydrous sodium sulfate. The product was evaporated and the remaining liquid was distilled to give the bicyclic nitrile, B.P. 66–67° C. at 0.2 mm.

*Example 2.—1-cyano-5-methoxy-benzocyclobutene*

(A) *Ethyl 2-bromo-4-methoxybenzyl-cyanoacetate.*—Ethyl cyanoacetate and alpha-chloro-ortho-bromo-paramethoxy toluene were reacted as in Example 1A to form ethyl 2-bromo-4-methoxybenzyl cyanoacetate; B.P. 148–151° C. (0.05 mm.).

*Analysis.*—Calcd. for $C_{13}H_{14}BrNO_3$: C, 50.01; H, 4.52; N, 4.49. Found: C, 50.11; H, 4.56; N, 4.37.

(B) *2-bromo - 4 - methoxybenzyl - cyanoacetic acid.*—Ethyl 2-bromo-4-methoxybenzyl-cyanoacetate was hydrolyzed as in Example 1B to form 2-bromo-4-methoxybenzyl-cyanoacetic acid; M.P. 114.5–147.5° C. after recrystallization from benzene.

*Analysis.*—Calcd. for $C_{11}H_{10}BrNO_3$: C, 46.50; H, 3.59; N, 4.93; Neut. equi., 284.12. Found: C, 46.38; H, 3.29; N, 4.98; Neut. equi., 281.14.

(C) *3-(2-bromo-4-methoxyphenyl)-propiononitrile.*—2-bromo-4-methoxybenzyl-cyanoacetic acid was reacted with dimethylacetamide as in Example 1C to give 3-(2-bromo-4-methoxyphenyl)-propiononitrile; B.P., 115–120° C. (0.15 mm.).

*Analysis.*—Calcd. for $C_{10}H_{10}BrNO$: C, 50.02; H, 4.20; N, 5.84. Found: C, 50.08; H, 4.12; N, 5.74.

(D) *1-cyano - 5 - methoxybenzocyclobutene.*—3 - (2-bromo - 4 - methoxyphenyl) - propiononitrile and sodium amide were reacted in liquid ammonia as in Example 1D to give 1-cyano-5-methoxybenzocyclobutene, B.P. 120–122° C. (0.25 mm.).

*Analysis.*—Calcd. for $C_{10}H_9NO$: C, 75.44; H, 5.70; N, 8.80. Found: C, 75.19; H, 5.52; N, 8.78.

Example 3.—N-acetyl-1-aminomethyl-benzocyclobutene 1-cyanobenzocyclobutene (12.9 g.) and 0.15 g. of platinum oxide in 50 ml. of acetic anhydride were treated with hydrogen at room temperature and an initial pressure of 3.3 atmospheres. The hydrogen uptake was complete after 32 hours. The catalyst was removed by filtration. The filtrate was poured into 300 g. of ice water which then was saturated with sodium bicarbonate. The organic layer was taken up in ether which was dried and evaporated. Distillation of the residue afforded the product as a colorless, viscous liquid, B.P. 150–154° C. at 0.5 mm.

*Analysis.*—Calcd. for $C_{11}H_{13}NO$: C, 75.39; H, 7.47; N, 7.99. Found: C, 75.52; H, 7.83; N, 8.15.

Example 4.—1-aminomethyl-benzocyclobutene hydrochloride

N-acetyl-1-aminomethyl-benzocyclobutene (11 g.) in 20% hydrochloric acid (40 ml.) was refluxed for 3.5 hours. The solution was diluted with water, filtered and evaporated to dryness. Recrystallization of the solid residue from aqueous ethanol gave the salt as white plates, M.P. 213–215° C.

*Analysis.*—Calcd. for $C_9H_{12}ClN$: Cl, 20.89; N, 8.26. Found: Cl, 21.02; N, 8.32.

Example 5.—N-methyl-1-aminomethyl-benzocyclobutene HCl (A) *Benzocyclobutene - 1 - carboxylic acid.*—1-cyanobenzocyclobutene (53 g.) was hydrolyzed to the corresponding acid by the method of Cava and Mitchell in J. Org. Chem. 27, 631 (1962). After recrystallization from n-hexane, the acid had a M.P. of 72.5–74° C.

(B) *1-hydroxymethyl-benzocyclobutene.*—Benzocyclobutene-1-carboxylic acid (71 g.) was reduced with lithium aluminum hydride to the primary alcohol by the procedure of Cava and Mitchell in J. Org. Chem. 27, 631 (1962). The product had a B.P. of 70° C. at 0.5 mm.

(C) *1-hydroxymethyl - benzocyclobutene tosylate.*—A solution of tosyl chloride (76.2 g.) in 150 ml. of pyridine was added over a 5 hour period to a solution of 1-hydroxymethyl-benzocyclobutene (46.9 g.) in 100 ml. of pyridine kept between 0–10° C. The orange colored mixture was stirred an additional 16 hours with cooling, then was poured into 1000 ml. of ice water. The separated oil was taken up in 1 liter of ether, which was washed several times with 250 ml. portions of 2 N sulfuric acid, once with 5% sodium bicarbonate (300 ml.) and finally with water. Evaporation of the dried solvent gave an oil which solidified on refrigeration under n-hexane. The pale yellow solid melted at 52–57° C.

*Analysis.*—Calcd. for $C_{16}O_{16}O_3S$: C, 66.64; H, 5.59; S, 11.12. Found: C, 66.77; H, 5.63; S, 10.93.

(D) *N - methyl - 1 - aminomethyl - benzocyclobutene HCl.*—A solution of 1-hydroxymethyl-benzocyclobutene tosylate (17.3 g.) in 125 ml. of benzene saturated at 10° C. with monomethylamine was heated in an autoclave at 100° C. for 24 hours. The cooled mixture was washed with dilute sodium bicarbonate, then with water and was dried over anhydrous sodium sulfate. The liquid remaining after solvent evaporation was dissolved in anhydrous ether and was treated with dry hydrogen chloride. The resulting salt melted at 192–194° C. after recrystallization from isopropyl alcohol.

*Analysis.*—Calcd. for $C_{10}H_{14}ClN$: Cl, 19.30; N, 7.63. Found: Cl, 19.37; N, 7.59.

Example 6.—N,N-dimethyl 1-aminomethyl-benzocyclobutene maleate

The amine (Example 5C) was prepared from 14.4 g. of 1-hydroxymethyl-benzocyclobutene tosylate and 100 ml. of dimethylamine saturated benzene by the same procedure followed for the monomethyl compound of Example 5D. The salt crystallized from 2-propanol as colorless plates, M.P. 116–118° C.

*Analysis.*—Calcd. for $C_{15}H_{19}NO_4$: C, 64.97; H, 6.90; N, 5.05. Found: C, 65.17; H, 6.94; N, 5.05.

Example 7.—1-(1-benzocyclobutenylmethylene)-morpholine HCl

A solution of 1-hydroxymethyl-benzocyclobutene tosylate (10.1 g.) and 8.7 g. of morpholine in 40 ml. of toluene was refluxed for 20 hours under nitrogen. The mixture was filtered of the precipitated salt and the filtrate evaporated to dryness. The residual oil was taken up in ether which was washed thoroughly with water, dried and evaporated. The remaining straw-colored liquid was allowed to react with dry hydrogen chloride in anhydrous ether. The white salt melted at 217.5–219° C. after recrystallization from 2-propanol.

*Analysis.*—Calcd. for $C_{13}H_{18}ClNO$: Cl, 14.79; N, 5.84. Found: Cl, 14.66; N, 5.81.

Example 8.—1-aminomethyl-5-methoxybenzocyclobutene HCl

A cold suspension of lithium aluminum hydride (2.88 g.) in 150 ml. of anhydrous ether was treated dropwise with a solution of 1-cyano-5-methoxybenzocyclobutene (9.6 g.) in 100 ml. of ether. After the addition was complete, the mixture was refluxed for 3 hours and then was stirred at room temperature for another 12 hours. The reaction was quenched by the careful introduction of water (25 ml.). After the addition of 30 ml. of 1% aqueous sodium hydroxide, the ether phase was separated, dried and evaporated. Distillation of the residual material gave a colorless liquid, B.P. 91–106° C. at 1 mm. An ethereal solution of the amine was treated with dry hydrogen chloride to afford a white, crystalline solid, M.P. 162–163° C. after recrystallization from isopropyl alcohol.

*Analysis.*—Calcd. for $C_{10}H_{14}ClNO$: C, 60.16; H, 7.06; Cl, 17.75; N, 7.02. Found: C, 59.97; H, 7.25; Cl, 17.98; N, 7.15.

Example 9.—1-aminomethyl-1-benzyl-benzocyclobutene HCl (A) *1-benzyl-1-cyano - benzocyclobutene.*—A solution of 1-cyano-benzocyclobutene (25.8 g.) and benzyl chloride (26.6 g.) in 200 ml. of dry benzene was treated portionwise with 7.8 g. of sodium amide. The temperature was kept below 40° C. during the addition. The well-stirred mixture was heated to 80° C. and was kept at that temperature for 4 hours. Water (100 ml.) was added, the benzene layer was separated and dried over anhydrous sodium sulfate. Solvent evaporation afforded an amber liquid which was distilled. The product, a colorless, viscous liquid, boiled at 118–122° C. (0.01 mm.).

*Analysis.*—Calcd. for $C_{16}H_{13}N$: C, 87.64; H, 5.97; N, 6.39. Found: C, 87.28; H, 6.20; N, 6.41.

(B) *1-aminomethyl-1-benzyl-benzocyclobutene HCl.*—A solution of 1-benzyl-1-cyanobenzocyclobutene (11 g.) in 100 ml. of anhydrous ether was added slowly to a cold suspension of lithium aluminum hydride (5.7 g.) in 150 ml. of dry ether. Following the addition, the mixture was refluxed for 9 hours; then the excess reagent was decomposed carefully with water. Evaporation of the dried ether solution afforded the amine as a clear, colorless liquid. It was redissolved in anhydrous ether and treated with dry hydrogen chloride. The amine salt was obtained as a white, crystalline solid on recrystallization from absolute ethanol, M.P. 220–221.5° C.

*Analysis.*—Calcd. for $C_{16}H_{18}ClN$: Cl, 13.64; N, 5.37. Found: Cl, 13.64; N, 5.36.

Example 10.—1-(1-aminoethyl)-benzocyclobutene HCl (A) *1-acetyl benzocyclobutene.*—To the Grignard reagent prepared from 5.8 g. of magnesium and 31.5 g. of methyl iodide was added with refluxing 25.8 g. of 1-cyanobenzocyclobutene in 100 ml. of ether. The mixture was heated for 5 hours and then was cooled; the complex was decomposed with saturated ammonium chloride solution.

Evaporation of the dried ether solution gave a viscous liquid which was heated in 100 ml. of water at 80° C. for 1 hour. The organic phase was taken up in ether which was dried and evaporated. Distillation of the residue gave the ketone as a colorless liquid, B.P. 93–103° C. at 3.5 mm.

(B) *1-acetyl benzocyclobutene oxime.*—To a cold solution of 2.4 g. of hydroxylamine hydrochloride and 2.8 g. of sodium acetate in 80 ml. of 50% aqueous ethanol was added dropwise 4.7 g. of 1-acetylbenzocyclobutene in 15 ml. of ethanol. The solution was stirred in an ice bath for 2 hours, at room temperature for 12 hours and finally it was refluxed for 1 hour. Solvent evaporation gave an oil which crystallized on cooling. Recrystallization from n-hexane afforded the oxime as a colorless solid, M.P. 90–91.5° C.

*Analysis.*—Calcd. for $C_{10}H_{11}NO$: C, 74.53; H, 6.88; N, 8.29. Found: C, 74.32; H, 6.82; N, 8.57.

(C) *1-(1-aminoethyl)-benzocyclobutene HCl.*—A solution of 1-acetyl benzocyclobutene oxime (7.7 g.) in 200 ml. of anhydrous ether was added over a 1-hour period to a suspension of lithium aluminum hydride (4 g.) in 200 ml. of ether. The reaction mixture was stirred at room temperature for 24 hours and then was treated carefully with 25 ml. of water. The oily residue from evaporation of the dried ether solution was allowed to react with ethereal hydrogen chloride. Recrystallization of the precipitated white solid from isopropyl alcohol afforded the amine salt, M.P. 212–213° C.

*Analysis.*—Calcd. for $C_{10}H_{14}ClN$: Cl, 19.30; N, 7.63. Found: Cl, 19.43; N, 7.51.

*Example 11.—N-(1-benzocyclobutenylmethyl)-5-oxo-2-pyrrolidinecarboxamide*

A solution of 5-oxo-2-pyrrolidinecarboxylic acid (1.55 g.) and triethylamine (1.2 g.) in 40 ml. of dichloromethane was cooled to 4° C., and ethyl chloroformate (1.3 g.) in 15 ml. of dichloromethane was added dropwise with stirring. After 1 hour a mixture of 1-aminomethyl-benzocyclobutene hydrochloride (2 g.) and triethylamine (1.2 g.) in 75 ml. of dichloromethane was added. The reaction mixture was stirred at room temperature for 18 hours. The organic phase was extracted with water and with 5% sodium bicarbonate and was dried over anhydrous sodium sulfate. Crystallization of the oily residue obtained on solvent evaporation from chloroform-n-hexane afforded a solid, M.P. 99–106° C.

Elution of this material from a column of alumina gave the amide as a white powder, M.P. 102–107° C.

*Analysis.*—Calcd. for $C_{14}H_{16}N_2O_2$: C, 68.83; H, 6.62. Found: C, 68.70; H, 6.89.

Various changes and modifications of the invention can be made and, to the extent that such variations incorporate the spirit of this invention, they are intended to be included within the scope of the appended claims.

What is claimed is:

1. A compound of the formula

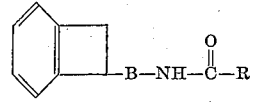

in which B is lower alkylene and R is lower alkyl.

2. N-acetyl-1-aminoethyl-benzocyclobutene.

3. A compound of the formula

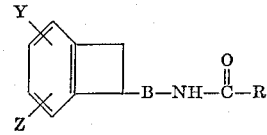

in which B is lower alkylene and R is a member of the group consisting of hydrogen, lower alkyl, phenyl, phenyl-lower alkyl, cycloalkyl having 3 to 7 carbons in the ring, cycloalkyl-lower alkyl having 3 to 7 carbons in the ring and 2-(5-pyrrolidone), and Y and Z are hydrogen, hydroxy, lower alkoxy, methylenedioxy or trifluoromethyl.

References Cited by the Examiner

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,362,614 | 11/1944 | Calva | 167—22 |
| 3,051,722 | 8/1962 | Biel | 260—247.2 |

OTHER REFERENCES

Blomquist et al.: Ann., vol. 653, pages 67–79, 1962, only page 71.

Cava et al.: J. Am. Chem. Soc., vol. 80, 1958, pages 2257–2263, only page 2260 relied on.

ALEX MAZEL, *Primary Examiner.*

HENRY R. JILES, *Examiner*

JOSE TOVAR, *Assistant Examiner.*

Notice of Adverse Decision in Interference

In Interference No. 96,856 involving Patent No. 3,308,157, J. E. Robertson and J. A. Skorcz, N-(BENZOCYCLOBUTENE-1-LOWERALKYL)-CARBOXYLIC ACID AMIDES, final judgment adverse to the patentees was rendered Mar. 31, 1972, as to claim 2.

[*Official Gazette August 22, 1972.*]